United States Patent Office 3,804,821
Patented Apr. 16, 1974

3,804,821
METHOD FOR THE DIRECT ACYLATION OF AMINOBENZOIC ACIDS
Peter L. de Benneville, Philadelphia, William J. Godfrey, Warminster, and Homer J. Sims, Horsham, Pa., assignors to Rohm and Haas Company, Philadelphia, Pa.
No Drawing. Filed May 24, 1972, Ser. No. 256,551
Int. Cl. C07c 103/20, 103/52
U.S. Cl. 260—112.5                    12 Claims

ABSTRACT OF THE DISCLOSURE

N-(N-acylaminoacyl)aminobenzoic acids are prepared by reacting a mixed anhydride of an N-acylamino acid with an aminobenzoic acid or an aminohippuric acid. A strong inorganic or organic acid can be used to catalyze the reaction.

---

This invention relates to the preparation of N-(N-acylaminoacyl)aminobenzoic and N-(N-acylaminoacyl)aminohippuric acids.

One of the most useful procedures for forming a peptide bond, that is, a bond between one amino acid derivative and another, is the so called "mixed anhydride method." In this method, a mixed anhydride is formed by the reaction of an acylated amino acid with an appropriate acyl halide, usually an acyl chloride, in the presence of a tertiary amine as an acid scavenging catalyst. In the prior art, to make the N-(N-acylaminoacyl)amino acids it has generally been necessary to react the mixed anhydride with either an ester or an alkali metal salt of the appropriate amino acid, rather than with the free acid itself, and then to convert this product to the desired free acid. However, when the alkali metal salt of the amino acid is employed, the reaction must be partially carried out in an aqueous system, and the consequent competitive hydrolysis of the mixed anhydride lowers the yield. Furthermore, it is often quite difficult to separate the desired product from unreacted starting materials. When the amino acid ester is used, as is usually done because somewhat better yields are obtained than with the alkali metal salt, a very sensitive selective hydrolysis of the resulting N-(N-acylaminoacyl)amino acid ester is required to produce the desired free acid. Furthermore, the reaction between the mixed anhydride and the ester must be carried out as rapidly as possible in the presence of a very weak base. Often significant disproportionation or racemization of the mixed anhydride can occur under these basic conditions. Since the hydrolysis rates can vary greatly, extensive experimentation is often necessary to determine the appropriate conditions for carrying out a successful selective hydrolysis of the ester. Since high yield and high optical purity are generally significant factors in the production of expensive or biologically-active peptides, a method of making peptides which maximizes yields and minimizes racemization would be particularly desirable. It has now been unexpectedly found that when the amine with which the mixed anhydride is to be reacted to form the peptide is an aminobenzoic acid or an aminohippuric acid, the free acid, rather than an ester or a salt of the acid, can be reacted directly with the mixed anhydride to form the desired peptide.

According to the invention, an N-(N-acylaminoacyl)-aminobenzoic acid can be prepared by contacting a mixed anhydride of an N-acylamino acid with an aminobenzoic acid or an aminohippuric acid. A wide variety of mixed anhydrides can be used in the method of the invention. Among the representative types of mixed anhydrides which can be used are those discussed in N. F. Albertson, Organic Reactions, 12, 157 (1962), including bis-(α-acyl-aminoacyl carbonates), α-acylaminoacyl chlorocarbonates, α-acylaminoacyl alkyl carbonates, α-acylamino acid carboxylic acid anhydrides, carbodiimides, ketenimines, α-acylamino acid phenolic esters, α-acylaminoacyl sulfates, α-acylaminoacyl alkyl and aryl sulfonates, α-acylaminoacyl phosphates, α-acylaminoacyl dichlorophosphates, and the like.

In a preferred embodiment of the invention, the mixed anhydride is an N-acylaminoacyl alkyl carbonate. The N-acylaminoacyl alkyl carbonates are preferred because they offer a minimum tendency to racemization of an optically active amino acid, and because the by-products of the subsequent reaction with the amine—an alcohol and carbon dioxide—can be easily separated. Virtually any N-acylaminoacyl alkyl carbonate mixed anhydride can be used as the mixed anhydride in the process of the invention, including N-alkylcarbonylaminoacyl alkyl carbonates, N-arylcarbonylaminoacyl alkyl carbonates, N-aralkylcarbonylaminoacyl alkyl carbonates, N-alkarylcarbonylaminoacyl alkyl carbonates, N-arylsulfonylaminoacyl alkyl carbonates, N-alkylsulfonylaminoacyl alkyl carbonates, N-alkylcarbamoylaminoacyl alkyl carbonates, N-arylcarbamoylaminoacyl alkyl carbonates, N-alkoxycarbonylaminoacyl alkyl carbonates, N-aryloxycarbonylaminoacyl alkyl carbonates, and the like. Particularly preferred are the N-acylaminoacyl alkyl carbonates which have the formula

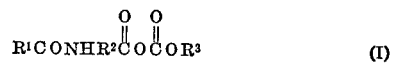     (I)

wherein $R^1$ is a hydrogen atom; a phenyl group; a phenyl group substituted with one or more halogen atoms, $(C_1-C_4)$ alkyl groups, hydroxy groups, $(C_1-C_4)$ alkoxy groups, $(C_1-C_4)$ alkoxy carbonyl groups, or similar substituents; a $(C_1-C_{12})$ alkyl group, preferably a $(C_1-C_6)$ alkyl group; a $(C_1-C_{12})$ alkyl group, preferably a $(C_1-C_6)$ alkyl group, substituted with one or more halogen atoms, $(C_1-C_4)$ alkoxy groups, hydroxy groups, acyloxy groups, preferably $(C_1-C_4)$ alkanoyloxy or benzoyloxy groups, polyalkoxyalkyl groups, phenyl groups, or similar substituents; a $(C_1-C_{12})$ alkoxy group, preferably a $(C_1-C_6)$ alkoxy group; an aryloxy or aralkoxy group having up to 10 carbon atoms, preferably a phenoxy or benzyloxy group; or a divalent alkylene group having up to 6 carbon atoms or a phenylene group, in which case Formula I would be written as $$R^1(CONHR^2COOCOR^3)_2 \quad \text{(Ia)}$$

$NHR^2CO$ is the residue of an amino acid, and
$R^3$ is a $(C_1-C_{18})$ alkyl group, preferably a $(C_1-C_4)$ alkyl group.

Also included are the mixed anhydrides which are derived from oxalic acid, having the formula

     (Ib)

wherein $NHR^2CO$ and $R^3$ are as defined above.

Representative embodiments of $R^1$ include hydrogen, phenyl, chlorophenyl, bromophenyl, dichlorophenyl, fluorophenyl, trifluoromethyl phenyl, tolyl, bromotolyl, xylyl, methoxyphenyl, butoxyphenyl, methyl, ethyl, propyl, butyl, cyclopentyl, pentyl, hexyl, cyclohexyl, octyl, nonyl, decyl, dodecyl, methoxy, ethoxy, butoxy, hexyloxy, dodecyloxy, methoxyethyl, acetoxyphenyl, propionoxyphenyl, hydroxypropyl, acetylethyl, benzoyloxyethyl, benzyl, chlorobenzyl, methoxybenzyl, benzyloxy, succinoyl, adipoyl, terephthaloyl, and the like.

Representative —$NHR^2CO$— amino acid residues are those derived from glycine, alanine, phenylalanine, methionine, tyrosine, tryptophan, leucine, ω-carbobenzoxylysine, N-nitroarginine, serine, valine, isoleucine, threonine, glutamine, proline, and the like.

The mixed anhydrides, including the N-acylaminoacyl alkyl carbonates, which are used in the method of the invention are known compounds or can be prepared by any of various well-known preparative techniques. One useful method for preparing the N-acylaminoacyl alkyl carbonates involves the reaction of an N-acylamino acid, preferably dissolved in an unreactive aprotic solvent, with an alkyl chloroformate, preferably a lower alkyl chloroformate in the presence of an equivalent amount of an organic tertiary amine. Isolation of the mixed anhydride thus formed is not necessary, and the acid can be added directly to the reaction mixture after the formation of the mixed anhydride. Other useful preparative techniques can be found in Albertson, op. cit., p. 157 et seq. and the references cited therein.

The N-acylaminoacyl alkyl mixed anhydride can be reacted with virtually any amiobenzoic acid or aminohippuric acid to produce the corresponding N-(N-acylaminoacyl)aminobenzoic acid. In a preferred embodiment of the invention, the acid has the formula

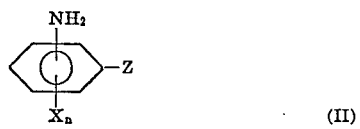

(II)

wherein

X is a hydroxy group, a ($C_1$–$C_4$) alkyl group, a halogen atom, preferably a chlorine or a bromine atom, a ($C_1$–$C_4$) alkoxy group, or any other substituent which will not interfere with the reaction between the acid and the mixed anhydride, Z is —COOH or —CONHCH$_2$COOH, and $n$ is 0, 1, or 2, preferably 0 or 1.

Representative aminobenzoic acids which can be used in the method of the invention are anthranilic acid, 3-aminobenzoic acid, 4-aminobenzoic acid, 4-amino-3-iodobenzoic acid, 4-amino-2-hydroxybenzoic acid, 3-amino-4-methylbenzoic acid, 4-amino-2-ethylbenzoic acid, 4-amino-2,6-dimethylbenzoic acid, 4-amino-2-butylbenzoic acid, 4-amino-2-bromobenzoic acid, 4-amino-2-ethoxybenzoic acid, 4-amino-3-ethoxybenzoic acid, 3-amino-4-hydroxybenzoic acid, 4-chloroanthranilic acid, 4-methylanthranilic acid, and the like.

The reaction between the mixed anhydride and the aminobenzoic acid or aminohippuric acid can be advantageously carried out in the presence of a strong acid as a catalyst. That a strong acid will catalyze the reaction between a mixed anhydride and an aminobenzoic acid is quite unexpected from prior art teaching relating to the catalysis of a reaction between mixed anhydrides and salts or esters of amino acids. Generally, the strong acid will enhance the rate of the reaction in proportion to its concentration in the reaction mixture. The strong acid catalyst can be either a strong inorganic acid, such as, for example, hydrogen chloride, hydrogen bromide, hydrogen iodide, sulfuric acid, chlorosulfuric acid, nitric acid, phosphoric acid, or the like, or a strong organic acid, such as benzenesulfonic acid, toluenesulfonic acid, methanesulfonic acid, or the like. The preferred acid catalysts are those which have good solubility in organic solvents. The catalyst can be used in any amount which will be effective to enhance the rate of reaction. Generally, the concentration of the catalyst in the reaction mixture will be about 0.5 mole percent to about 50 mole percent or more, and preferably about 1 mole percent to about 10 mole percent.

The process of the invention can be carried out over a broad temperature range, and the temperature at which the reaction is run will depend in part on the particular mixed anhydride and aminobenzoic acid which are used as starting materials. Generally, the reaction will be run at a temperature of about —20° C. to about +10° C., and preferably about —15° C. to about +5° C. Although the process is generally carried out at atmospheric pressure, it may be advantageous to employ higher or lower pressures under some reaction conditions.

In carrying out the process of the invention, an organic solvent, inert to the reaction, is generally used. Among the suitable solvents which can be used are tetrahydrofuran, dioxane, ethylene glycol dimethyl ether, diethylene glycol dimethyl ether, dimethylacetamide, N-methylacetamide, ethyl acetate, sulfolane, dimethyl formamide, and the like. The preferred solvents are those which are known in the art as especially useful in the generalized mixed anhydride method.

The mixed anhydride and the aminobenzoic or aminohippuric acid are generally used in stoichometric proportions. The mixed anhydride is advantageously prepared in situ, with the aminobenzoic acid being added after the formation of the mixed anhydride. The reaction is allowed to proceed until the mixed anhydride is substantially used up, which can conveniently be determined, for example, by thin layer chromatography of samples taken from the reaction mixture. Isolation of the desired product can be accomplished in any convenient fashion. One useful separation procedure involves adding the reaction mixture to a dilute inorganic acid to remove any remaining amine contaminants, filtering, and recrystallizing the solid product.

N-(N-acylaminoacyl)aminobenzoic acids made by the process of the invention are useful compounds, particularly in diagnosing pancreatic enzyme insufficiency in animals. This use is described in U.S. patent application Ser. No. 91,173, of P. L. de Benneville and N. J. Greenberger, entitled "Method for Evaluating Pancreatic Enzyme Sufficiency and Compounds Useful Therein," filed on Nov. 19, 1970, and assigned to a common assignee. The compounds prepared by the process of the invention are also useful as lubricating additives, and as chemical intermediates in preparing surfactants, emulsifiers, and plasticizers.

The following examples will further illustrate this invention but are not intended to limit it in any way. All temperatures are in degrees centigrade unless otherwise stated.

EXAMPLE 1

Preparation of N-benzoyl-L-phenylalanyl-p-aminobenzoic acid

A solution of benzoyl-L-phenylalanine (1.345 g., 5 mmoles) in 20 ml. of tetrahydrofuran (THF) was cooled to —15°. N-methylmorpholine (0.51 g., 5 mmoles) was added, followed by ethyl chloroformate (0.54 g., 5 mmoles). After 12 minutes at —15° C., a solution of p-aminobenzoic acid (0.685 g., 5 mmoles) in 10 ml. THF was added, followed directly by p-toluenesulfonic acid (0.095 g., 0.5 mmole), dissolved in 10 ml. THF. The reaction was then allowed to warm up to 5° C., where it was held for 2 hours. The mixture was poured into 250 ml. cold 0.1 N HCl, filtered and dried to give 1.9 g. crude product, M.P. 244–248°. Upon recrystallization from 50 ml. methanol containing 4 ml. water, there was recovered 1.6 g. (82.5%) of product, M.P. 254–6°, neutralization equivalent 386 (theory 388), $[\alpha]^{D}_{25}$. +68.3° (1% in DMF).

*Analysis.*—Percent C: found 71.4 (calc'd 71.1); percent H: found 5.3 (calc'd 5.2); percent N: found 7.1 (calc'd 7.2).

EXAMPLE 2

Preparation of N-benzoyl-L-phenylalanyl-p-aminohippuric acid

Following the procedure of Example 1, p-aminobenzoic acid was replaced with p-aminohippuric acid which was not soluble in THF, and was introduced as a slurry (0.97 g., 5 mmoles in 50 ml. THF). After 3 hours at 5°, the reaction mixture was poured into 400 ml. cold 0.1 N HCl, filtered and dried to give 2.1 g., M.P. 208–212°. After recrystallization from aqueous methanol (1:1), there was recovered 1.9 g., of product, M.P. 210–212°. After correction for water of crystalization (found 3.66%), analyses were percent C.: 67.2 (calc'd 67.4); percent H: 5.5 (calc'd 5.2); percent N: 9.5 (calc'd 9.4); neutralization equivalent 447 (calc'd 445).

EXAMPLE 3

Preparation of O,N-dibenzoyl-L-tyrosyl-p-aminobenzoic acid

To a slurry of tyrosine (18.1 g., 0.1 mole) in 200 ml. water at 0–5°, there was added 100 ml. 2 N sodium hydroxide to dissolve the tyrosine. Benzoyl chloride (28.1 g., 0.2 mole) was added at the same time as 50 ml. 2 N sodium hydroxide, the pH being maintained about 10–11 over a 2 hour period. The reaction was acidified with 100 ml. 2 N hydrochloric acid, filtered, and the product washed and dried. It was recrystallized from ethyl acetate to give 14.8 g., M.P 215°, neutralization 392 (theory 389), $[\alpha]^D_{25}$ —82.3 as the main fraction (altogether 24.7 g. of material with good purity was recovered or 63%).

Analysis.—Percent C. 71.3 found (71.0 calc'd); percent H: 4.91 found (4.88 calc'd); percent N: 3.54 found (3.60 calc'd).

A sample of O,N-dibenzoyl-L-tyrosine (7.78 g., 20 mmoles) dissolved in 60 ml. THF was cooled to —15°, and N-methylmorpholine (2.04 g., 20 mmoles) and ethyl chloroformate (2.08 g., 20 mmoles) were added as described. After 12 minutes, p-aminobenzoic acid (2.74 g., 20 mmoles) dissolved in 25 ml. THF and p-toluenesulfonic acid (0.38 g., 2 mmoles) dissolved in 10 ml. THF were added, using THF for washing to a total of 120 ml. After 3 hours at 5°, the mixture was poured into 1 liter of 0.1 N cold HCl, filtered, washed and dried to give 9.5 g. white solid, M.P. 277–280° (dec.). After recrystallization from methanol (2.7 liters) and water (600 ml.), the product melted at 290° C., $[\alpha]^D_{25}$ +64.1 (1% in DMF), 6.6 g.

Analysis.—Percent C: found 71.0 (calc'd 70.9); percent H: found 4.7 (calc'd 4.7); percent N: found 5.5 (calc'd 5.5); neutralization equivalent 502; theory 508.

EXAMPLE 4

Preparation of N-benzoyl-L-tyrosyl-p-aminobenzoic acid

To a solution of L-tyrosine ethyl ester hydrochloride (24.5 g., 0.1 mole) in 50 ml. water was added 200 ml. 2 N sodium carbonate solution and 500 ml. chloroform, with stirring to maintain good suspension. After cooling to 5°, benzoyl chloride (14.1 g., 0.1 mole) was added dropwise over a period of an hour. After 30 minutes, the chloroform layer was separated, washed with water, and 1 N hydrochloric acid, dried over MgSO₄, and evaporated, to give 31 g. (quantitative) of N-benzoyl-L-tyrosine, ethyl ester, as white solid residue, M.P. 123–124°.

A sample of N-benzoyl-L-tyrosine, ethyl ester (29.5 g., 0.095 m) was slurried in 60 ml. of 5 N sodium hydroxide, with warming to 50° over a 10 minute period. It was allowed to stand at room temperature for one hour, then 400 ml. of water was added dropwise to 400 ml. of 1 N hydrochloric acid at 5° with stirring to give a sticky mass. The product was taken up in ethyl acetate (300 ml.), dried over MgSO₄ and evaporated to a sticky residue. Upon refluxing in 100 ml. CCl₄ (discarded) and a second 100 ml. CCl₄, the residue crystallized, was filtered and dried, to give 25.4 g. (94%) of N-benzoyl-L-tyrosine, M.P. 162–163°, neutralization equivalent 283 (theory 285), $[\alpha]^D_{25}$ —71.2° (1% in DMF).

A solution was made of N-benzoyl-L-tyrosine (5.7 g., 20 mmoles) and N-methylmorpholine (2.04 g., 20 mmoles) in 60 ml. of THF, at —15°, and to it was added ethyl chloroformate (2.08 g., 20 mmoles). After 12 minutes, p-aminobenzoic acid (2.74 g., 20 mmoles) dissolved in 25 ml. of THF and 0.38 g. of p-toluenesulfonic acid (2 mmoles) were added, and the temperature allowed to rise to 5°. After 2 hours and forty minutes, the mixture was poured into 1 liter of 0.1 N cold hydrochloric acid, stirred one-half hour, filtered and dried, to give 8.7 g. of product, M.P. 192–223. The product was recrystallized from 90 ml. methanol and 40 ml. water, to give 6 g. (74%) of product, M.P. 240–242°, $[\alpha]^D_{25}$ +72.3° (1% in DMF).

Analysis.—Percent C: found 68.1 (calc'd 68.3); percent H: found 5.1 (calc'd 5.0); percent N. found 6.7 (calc'd 6.9); neutralization equivalent 413 (theory 404).

EXAMPLE 5

Preparation of N-benzoyl-L-phenylalanylanthranilic acid

Following the procedure of Example 4, using the mixed anhydride method, from anthranilic acid (2.74 g., 20 mmoles) and benzoyl-L-phenylalanine (5.38 g., 20 mmoles) after 3½ hours at 5°, a crude product weighing 7.35 g. (95% of theory), M.P. 215–218° $[\alpha]^D_{25}$ +5.4°, was obtained. After recrystallization from methanol, the product (4.65 g.) melted at 218° $[\alpha]^D_{25}$ +9.7; neutralization equivalent 392 (theory 388).

Analysis.—Percent C: found 71.0 (calc'd 71.1); percent H: found 5.2 (calc'd 5.2); percent N: found 7.2 (calc'd 7.2).

EXAMPLE 6

Preparation of adipoyl bis-(L-tyrosyl-p-aminobenzoic acid)

L-tyrosine (7.24 g.) and adipoyl chloride (1.83 g.) were added to 75 ml. anhydrous tetrahydrofuran (THF), and the mixture was heated and stirred at reflux for two hours. Tyrosine hydrochloride was filtered off, and rinsed in with 75 ml. of THF. To the filtrate, at —20°, was added N-methylmorpholine (2.02 g.) and ethyl chloroformate (2.17 g.) all at once. After 12 minutes, there was then added p-aminobenzoic acid (2.74 g.) and p-toluenesulfonic acid (0.38 g.). After standing 2½ hours at 5° C., the reaction mixture was poured into 600 ml. of 0.1 N hydrochloric acid, and filtered. After recrystallization from methanol and water, 3.15 g. of white solid was obtained—melting at 262° with decomposition, $[\alpha]^D_{24}$ +72.7° (1% in dimethylformamide).

Analysis, after adjustment for water, was percent C: found 64.2 (calc'd 64.2); percent H: found 5.35; percent N: found 7.5 (calc'd 7.9).

EXAMPLE 7

Preparation of N-benzoyl-L-methionyl-p-aminobenzoic acid

L-methionine (8.94 g.) and benzoyl chloride (4.23 g.) were added to 75 ml. tetrahydrofuran, and the mixture refluxed for two hours. The mixture was cooled, insoluble L-methionine hydrochloride was filtered off, and washed with 75 ml. tetrahydrofuran. The solution was cooled to —15°, and to it were rapidly added N-methylmorpholine (3.03 g.) and ethyl chloroformate (3.24 g.). After 12 minutes, p-aminobenzoic acid (4.11 g.) and p-toluenesulfonic acid (0.57 g.) dissolved in 30 ml. THF were added. After two hours at 5°, the mixture was poured into 1.5 liters of cold 0.1 N hydrochloric acid, filtered and recrystallized from ethyl acetate to give 6.4 g. of white solid—melting at 205°, $[\alpha]^D_{24}$ +65.7° (1% in dimethylformamide).

Analysis.—Percent C: found 61.5 (calc'd 61.3); percent H: found 5.4 (calc'd 5.4); percent N: found 7.3 (calc'd 7.5); percent S: found 8.7 (calc'd 8.6).

EXAMPLE 8

Preparation of N-benzoyl-L-leucyl-p-aminobenzoic acid

Following the procedure of Example 7, substituting L-leucine for L-methionine in the same molecular proportion, there was obtained a white solid in good yield, M.P.

198–200°, $[\alpha]^D_{24}$ +95.2, percent N: found 7.5 (calc'd 7.9).

EXAMPLE 9

Preparation of N-benzoyl-L-tryptophyl-p-aminobenzoic acid

A mixture of L-tryptophane (20.4 g.) and benzoyl chloride (7.03 g.) in 100 ml. dry tetrahydrofuran was refluxed for two hours, cooled and tryptophane hydrochloride removed by filtration. To the filtrate at −15° was added N-methylmorpholine (5.05 g.) and ethyl chloroformate (5.43 g.), followed in twelve minutes by p-aminobenzoic acid (6.85 g.) and p-toluenesulfonic acid monohydrate (0.95 g.). After one hour at −15°, and two hours at 5°, the reaction mixture was poured into 1.5 liters of cold 0.1 N hydrochloric acid. The product was recovered by filtration, washed and dried. It was twice dissolved in ethyl acetate, and petroleum ether was added to effect recrystallization. Charcoal was used to remove some color. The product, a light tan solid, amounted to 11.5 g., $[\alpha]^D_{25.5}$ +75.8. The neutralization equivalent was 434 (theory 427), percent N: found 9.5 (calc'd 9.8).

EXAMPLE 10

Preparation of N-acetyl-L-tyrosyl-p-aminobenzoic acid

To a slurry of L-tyrosine (72.4 g.) in 500 ml. dry tetrahydrofuran was added 15.7 g. acetyl chloride. The mixture was stirred for 18 hours at room temperature, and the tyrosine hydrochloride was removed by filtration. The filtrate was cooled to −15°, N-methylmorpholine (20.2 g.) and ethyl chloroformate (21.7 g.) were added, and 15 minutes later p-aminobenzoic acid (27.4 g.) and p-toluenesulfonic acid monohydrate (3.8 g.) were added. After one-half hour at −15°, the mixture was stirred at 5° for three hours, and then poured into 6 liters of cold 0.1 N hydrochloric acid, filtered, and dried. The crude product (47 g.) was recrystallized first from ethanol, ethyl acetate and petroleum ether, and then from aqueous methanol. The final recrystallized product, 26 g., melted at 229–231°, $[\alpha]^D_{25.5}$ +91.5° (1% in dimethylformamide), neutralization equivalent 367, theory 342, percent N: found 7.7 (calc'd 8.2).

EXAMPLE 11

Preparation of N-propionyl-L-tyrosyl-p-aminobenzoic acid

Following the procedure of Example 10, substituting 18.5 g. propionyl chloride for the acetyl chloride, 46 g. of crude product was obtained. After two recrystallizations, in the manner described above, the product melted at 241–242°, $[\alpha]^D_{25.5}$ +89.6 (1% in DMF), neutralization equivalent 372, theory 356; percent C: found 63.7 (calc'd 64.1); percent H: found 5.9 (calc'd 5.6); percent N: found 7.6 (calc'd 7.9).

EXAMPLE 12

Preparation of N-butyryl-L-tyrosyl-p-aminobenzoic acid

Following the procedure of Example 10, substituting 20.6 ml. butyryl chloride for the acetyl chloride, there was obtained 49.1 g. of crude product which was recrystallized twice as described previously. The product melted at 223–26°; $[\alpha]^D_{26}$ +78.4 (1% in DMF); neutralization equivalent 383, theory 370; percent C: found 64.5 (calc'd 64.9); percent H: found 6.2 (calc'd 6.0); percent N: found 7.4 (calc'd 7.6).

EXAMPLE 13

Preparation of N-ethoxycarbonyl-L-tyrosyl-p-aminobenzoic acid

A mixture of L-tyrosine (36.2 g.) and ethyl chloroformate (10.9 g.) in 200 ml. tetrahydrofuran was refluxed for 24 hours. After the tyrosine hydrochloride was removed by filtration, the solution was cooled to −15°, and to it were added N-methylmorpholine (10.1 g.) and ethyl chloroformate (10.9 g.) and 15 minutes later p-aminobenzoic acid (13.7 g.) and p-toluenesulfonic acid monohydrate (1.9 g.). After one-half hour at −15°, the mixture was allowed to stand for 24 hours at 5°. It was then poured into dilute aqueous acid, and the gummy precipitate was extracted with one liter of ethyl acetate. The extract was dried over anhydrous magnesium sulfate, and stripped to about 100 ml., at which point solids precipitated. The solution was warmed to dissolve the solids, and then chilled to −20° to precipitate 20 g. of crude product. This was recrystallized again from 100 ml. of ethyl acetate, chilling to −20°, to yield 16 g. of purified product, which had $[\alpha]^D_{25.5}$ +84.3 (1% in DMF); neutralization equivalent 379 (theory 372); percent C: found 61.8 (calc'd 61.3); percent H: found 5.7 (calc'd 5.4); percent N: found 7.3 (calc'd 7.5).

EXAMPLE 14

Preparation of N-benzoyl-L-tyrosyl-anthranilic acid

A solution of benzoyl-L-tyrosine in tetrahydrofuran was made by refluxing a mixture of benzoyl chloride (26.1 g.) and L-tyrosine (72.4 g.) in 400 ml. THF for two hours, cooling, filtering, and washing the precipitated-L-tyrosine hydrochloride with 150 ml. THF. The filtrate, 540 ml., was divided in half, one part being used in this example; and the other in Example 15.

One-half the filtrate, 270 ml., was cooled to −20°, N-methylmorpholine (10.1 g.) and ethyl chloroformate (10.9 g.) were added and the reaction was stirred at −15° for ten minutes. Then, anthranilic acid (13.7 g.) and p-toluene-sulfonic acid (1.9 g.) were added. After one-half hour at −15°, the reaction mixture stood at 0° for two hours, and was then poured into 4 liters of cold 0.1 N hydrochloric acid. The crude product was recovered by filtration and dried. It was recrystallized from methanol and water to give 31.8 g., M.P. 204–208°, $[\alpha]^D_{25.5}$ +1.5° (1% in DMF).

*Analysis.*—Percent C: found 68.3 (calc'd 68.3); percent H: found 5.2 (calc'd 5.0); percent N: found 6.8 (calc'd 6.9).

EXAMPLE 15

Preparation of benzoyl-L-tyrosyl-m-aminobenzoic acid

Following the procedure of Example 14, from the other half of the benzoyl-L-tyrosine filtrate, substituting m-aminobenzoic acid for the anthranilic acid, there was obtained 30.9 g. of the meta-isomer, M.P. 249–253°; $[\alpha]^D_{25.5}$ +56.8 (1% in DMF).

*Analysis.*—Percent C: found 68.2 (calc'd 68.3); percent H: found 5.0 (calc'd 5.0); percent N: found 6.8 (calc'd 6.9).

EXAMPLE 16

Preparation of benzoyl-L-tyrosyl-4-amino-3-iodobenzoic acid

Benzoyl-L-tyrosine (14.3 g.) was dissolved in 200 ml. tetrahydrofuran, cooled to −20°, and converted to mixed anhydride by the simultaneous addition of N-methylmorpholine (5.05 g.) and ethyl chloroformate (5.43 g.). After ten minutes at −15°, 4-amino-3-iodobenzoic acid (13.2 g.) were added. The reaction was stirred for one-half hour at −15°, and then stood overnight at 0–5°. The mixture was poured into 3 liters of cold 0.1 N hydrochloric acid, the water layer was decanted from a viscous oil layer, and the oil layer was dried to a sticky solid. This solid (18 g.) was recrystallized from methanol to give 4 g. of off-white solids, M.P. 228–230°, $[\alpha]^D_{25.6}$ −25.6 (1% in DMF).

*Analysis.*—Percent N: found 5.0 (calc'd 5.3); percent I: found 23.12 (calc'd 23.96).

EXAMPLE 17

Preparation of benzoyl-L-tyrosyl-4-amino-2-hydroxybenzoic acid

Benzoyl-L-tyrosine (28.5 g.), dissolved in 270 ml. tetrahydrofuran, was cooled to −20°, and converted as above to mixed anhydride. Para-aminosalicylic acid (19.0 g.) and p-toluenesulfonic acid monohydrate (1.9 g.) were added, the mixture was stirred from one-half hour at −15°, and stood overnight at 0°. It was poured into two liters of 0.1 N hydrochloric acid, filtered, and the precipitate dried. Recrystallized from methanol and water, the product melted with decomposition at 185–195°, had $[\alpha]^D_{26°}$ +77° (1% in DMF), a neutralization equivalent of 422 (theory 420) and the following analysis: Percent C: found 66.0 (calc'd 65.7); percent H: 4.5 (calc'd 4.8); percent N: 6.5 (calc'd 6.7).

EXAMPLE 18

Preparation of benzoyl-L-tyrosyl-4-amino-3-methylbenzoic acid

Following the procedure of Example 17, benzoyl-L-tyrosyl-4-amino-3-methylbenzoic acid was prepared from the mixed anhydride derived from benzoyl-L-tyrosine (8.55 g.), by reaction with 4-amino-3-methylbenzoic acid 4.53 g.) and p-toluenesulfonic acid (0.57 g.). After recrystallization from methanol and water and drying, a white product, 8.7 g., melting at 242–44°, was obtained. This material had a neutralization equivalent of 403 (theory 418) and the following analysis: Percent C: found 68.8 (calc'd 68.9); percent H: found 5.4 (calc'd 5.3); percent N: found 6.6 (calc'd 6.7).

EXAMPLE 19

Preparation of benzoyl-L-tyrosyl-4-amino-3,5-dimethylbenzoic acid

Benzoyl-L-tyrosine (4.27 g.) was dissolved in 100 ml. tetrahydrofuran and cooled to −20°. N-methylmorpholine (1.52 g.) and ethyl chloroformate (1.65 g.) were added simultaneously, and the mixture was stirred for ten minutes at −15°. To it was added 4-amino-3,5-dimethylbenzoic acid (2.48 g.) and p-toluenesulfonic acid (0.28 g.). After 48 hours at 0°, the reaction was poured into 1.5 liters of cold 0.1 N hydrochloric acid, the solid precipitate was filtered off, and recrystallized from methanol and water, to give 4.77 g. of the desired product, M.P. 244–248°, $[\alpha]^D_{26°}$ −36.9°, neutralization equivalent 426, theory 432.

EXAMPLE 20

Use of hydrogen chloride as catalyst

In any of the above examples, a solution of hydrogen chloride can be substituted for the p-toluenesulfonic acid. For example, for a 1 mole run using 137 g. of p-aminobenzoic acid 6 g. of a 10% solution of hydrogen chloride in tetrahydrofuran (0.0165 mole) will cause the reaction with mixed anhydride from benzoyl-L-tyrosine and ethyl chloroformate to be complete in about three hours at 0 to 5°. Similarly small amounts of hydrogen bromide, methanesulfonic acid, and sulfuric acid will give increased rates of reaction.

EXAMPLE 21

Following the procedures of Examples 1 to 20, other N-(N-acylaminoacyl)aminobenzoic acids and N-(N-acylaminoacyl) aminohippuric acids are prepared, including those in which $R_1$ in Formula I is hydrogen, octyl, p-chlorophenyl, tolyl, and terephthaloyl, and those in which $NHR^2CO$ is derived from glycine and alanine.

EXAMPLE 22

Following the procedures of Examples 1 to 21, N-(N-acylaminoacyl)aminobenzoic acids and N-(N-acylaminoacyl)aminohippuric acids are prepared from various mixed anhydrides, including N-alkylcarbonylaminoacyl alkyl chlorocarbonates, N-alkylcarbonylaminoacid carboxylic acid anhydrides, and N-alkylcarbonylaminoacyl sulfates, sulfonates, and phosphates.

It is to be understood that changes and variations may be made without departing from the spirit and scope of the invention as defined by the appended claims.

What is claimed is:

1. A process for the preparation of an N-(N-acylaminoacyl)aminobenzoic acid which comprises reacting a mixed anhydride of an N-acylamino acid with an aminobenzoic acid.

2. The process of claim 1 wherein the mixed anhydride is an N-acylaminoacyl alkyl carbonate.

3. The process of claim 2 wherein the mixed anhydride has the formula

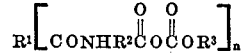

wherein $R^1$ is a hydrogen atom; a phenyl group; a phenyl group substituted with one or more halogen atoms, $(C_1-C_4)$alkyl groups, hydroxy groups, $(C_1-C_4)$alkoxy groups, or $(C_1-C_4)$alkoxy carbonyl groups; a $(C_1-C_{12})$alkyl group; a $(C_1-C_{12})$alkyl group substituted by one or more halogen atoms, $(C_1-C_4)$alkoxy groups, hydroxy groups, $(C_1-C_4)$alkanoyloxy groups, benzoyloxy groups, or phenyl groups; a $(C_1-C_{12})$alkoxy group; an aryloxy group having up to 10 carbon atoms; or a divalent alkylene group having 0 to 6 carbon atoms;

$NHR^2CO$ is the residue of an amino acid;

$R^3$ is a $(C_1-C_{18})$alkyl group; and $n$ is 1 or 2, and equal to the valence of $R^1$.

4. The process of claim 3 wherein $NHR^2CO$ is derived from phenylalanine, tyrosine, tryptophan, methionine, or leucine.

5. The process of claim 3 wherein the aminobenzoic acid has the formula

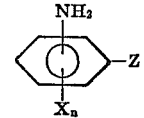

wherein

X is a hydroxy group, a $(C_1-C_4)$alkyl group, a halogen atom, or a $(C_1-C_4)$alkoxy group;

Z is —COOH or —CONHCH$_2$COOH; and $n$ is 0, 1, or 2.

6. The process of claim 5 wherein $R^1$ is a phenyl group.

7. The process of claim 6 wherein $R^2$ is derived from phenylalanine, Z is —COOH, and $n$ is 0.

8. The process of claim 6 wherein $R^2$ is derived from tyrosine, Z is —COOH, and $n$ is 0.

9. The process of claim 6 wherein $R^2$ is derived from tryptophan, Z is —COOH, and $n$ is 0.

10. The process of claim 5 wherein $R^1$ is a $(C_1-C_4)$ alkyl group.

11. The process of claim 5 wherein $R^3$ is a $(C_1-C_4)$ alkyl group.

12. The process of claim 1 wherein the process is carried out in the presence of a catalytic amount of a strong inorganic acid or a strong organic acid.

References Cited

UNITED STATES PATENTS

| | | | |
|---|---|---|---|
| 3,640,991 | 2/1972 | Callahan | 260—112.5 |
| 3,264,281 | 8/1966 | Applewhite et al. | 260—112.5 |
| 3,124,564 | 3/1964 | McKay | 260—112.5 |

LEWIS GOTTS, Primary Examiner

R. J. SUYAT, Assistant Examiner

U.S. Cl. X.R.

260—558 A